US010821934B2

(12) United States Patent
Hall et al.

(10) Patent No.: US 10,821,934 B2
(45) Date of Patent: Nov. 3, 2020

(54) PASSENGER RESTRAINT WITH INTEGRATED AUDIO SYSTEM

(71) Applicant: Universal City Studios LLC, Universal City, CA (US)

(72) Inventors: Gregory S. Hall, Orlando, FL (US); Keith Michael McVeen, Winter Garden, FL (US); Brian Birney McQuillian, Orlando, FL (US)

(73) Assignee: Universal City Studios LLC, University City, CA (US)

( * ) Notice: Subject to any disclaimer, the term of this patent is extended or adjusted under 35 U.S.C. 154(b) by 356 days.

(21) Appl. No.: 15/792,522

(22) Filed: Oct. 24, 2017

(65) Prior Publication Data

US 2019/0118760 A1 Apr. 25, 2019

(51) Int. Cl.
*B60R 22/14* (2006.01)
*A63G 7/00* (2006.01)
*A63G 31/00* (2006.01)
*B60R 22/48* (2006.01)
*B60R 21/00* (2006.01)

(52) U.S. Cl.
CPC ............... *B60R 22/14* (2013.01); *A63G 7/00* (2013.01); *A63G 31/00* (2013.01); *B60R 2021/0097* (2013.01); *B60R 2022/4816* (2013.01)

(58) Field of Classification Search
CPC .. A63G 31/00; A63G 7/00; B60R 2021/0097; B60R 2022/4816; B60R 22/14; B60R 22/48; H04B 1/385; H04B 1/0343; H04B 2001/3855
See application file for complete search history.

(56) References Cited

U.S. PATENT DOCUMENTS

| | | | |
|---|---|---|---|
| 5,623,878 A | 4/1997 | Baxter et al. | |
| 6,007,338 A | 12/1999 | DiNunzio et al. | |
| 6,060,847 A * | 5/2000 | Hettema | A63G 7/00 318/560 |
| 6,220,171 B1 | 4/2001 | Hettema et al. | |
| 6,351,210 B1 * | 2/2002 | Stewart | B60R 22/48 180/268 |
| 6,922,876 B2 * | 8/2005 | Kobayashi | B60R 11/02 24/633 |
| 7,661,960 B2 * | 2/2010 | Tanoi | B60J 7/0573 439/31 |

(Continued)

FOREIGN PATENT DOCUMENTS

WO 2013187235 12/2013

OTHER PUBLICATIONS

PCT/US2018/057136 Invitation to Pay Additional Fees dated dated Jan. 1, 2019.

(Continued)

*Primary Examiner* — Mark T Le
(74) *Attorney, Agent, or Firm* — Fletcher Yoder, P.C.

(57) ABSTRACT

Present systems and methods are directed to an audio system integrated into a restraint system for an amusement park ride vehicle. Specifically, a system includes a restraining system for a ride vehicle of an amusement park. The system includes an audio system comprising a speaker and a microphone, wherein the audio system is positioned inside of the restraining system and configured to produce audio via the speaker in response to a received audio activation signal.

19 Claims, 9 Drawing Sheets

(56) References Cited

U.S. PATENT DOCUMENTS

| | | |
|---|---|---|
| 7,788,215 B2 | 8/2010 | Trowbridge et al. |
| 9,084,941 B1 | 7/2015 | Fram |
| 9,744,930 B2 | 8/2017 | Howard |
| 2005/0070247 A1* | 3/2005 | Larson .................. H04W 4/024 |
| | | 455/404.1 |
| 2006/0135271 A1 | 6/2006 | Casey et al. |
| 2013/0147247 A1 | 6/2013 | Sims |
| 2016/0176380 A1* | 6/2016 | Demeritte ............... B60R 22/48 |
| | | 340/687 |
| 2017/0252658 A1 | 9/2017 | Reveley |

OTHER PUBLICATIONS

PCT/US2018/057136 Search Report and Written Opinion dated Feb. 28, 2019.

* cited by examiner

PASSENGER RESTRAINT WITH INTEGRATED AUDIO SYSTEM

BACKGROUND

The present disclosure relates generally to amusement park-style rides, and more specifically to systems and methods for securing passengers inside the amusement park-style rides.

Most amusement park-style rides include a ride vehicle that carries passengers along a ride path, for example a track. Over the course of the ride, the ride path may include a number of features, including tunnels, turns, ups, downs, loops, and so forth. As such, riders may be subject to forces that could move them out of proper positioning or orientation within the ride vehicle. Accordingly, it is desirable to restrain riders while the ride is in operation.

Furthermore, the amusement park experience for a ride passenger may be improved by providing ride passengers with experience-enhancing effects. It is now recognized that locating features for providing such effects can be difficult within the confines of certain ride systems.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with one embodiment, a system includes a restraining system for a ride vehicle of an amusement park. The system includes an audio system comprising a speaker and a microphone, wherein the audio system is positioned inside of the restraining system and configured to produce audio via the speaker in response to an audio activation signal.

In accordance with one embodiment, a ride system includes a first audio system positioned inside a first restraining system associated with a first ride vehicle, a first speaker of the first audio system, and a first microphone of the first audio system. The ride system also includes a second audio system positioned inside a second restraining system associated with a second ride vehicle, wherein the first audio system and the second audio system are communicatively coupled to one another to facilitate transmission of audio data there between. The second audio system includes a second speaker of the second audio system, and a second microphone of the second audio system.

In accordance with one embodiment, a method includes retracting a restraining system associated with a ride vehicle, wherein retracting the restraining system comprises moving the restraining system into an unlocked position, and wherein the ride vehicle is configured to receive a ride passenger when the restraining system is in the unlocked position. The method further includes determining, via a processor, whether the restraining system is in a locked position and controlling an audio system associated with the ride vehicle based on the restraining system being in the locked position or the unlocked position, wherein the audio system comprises a speaker.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
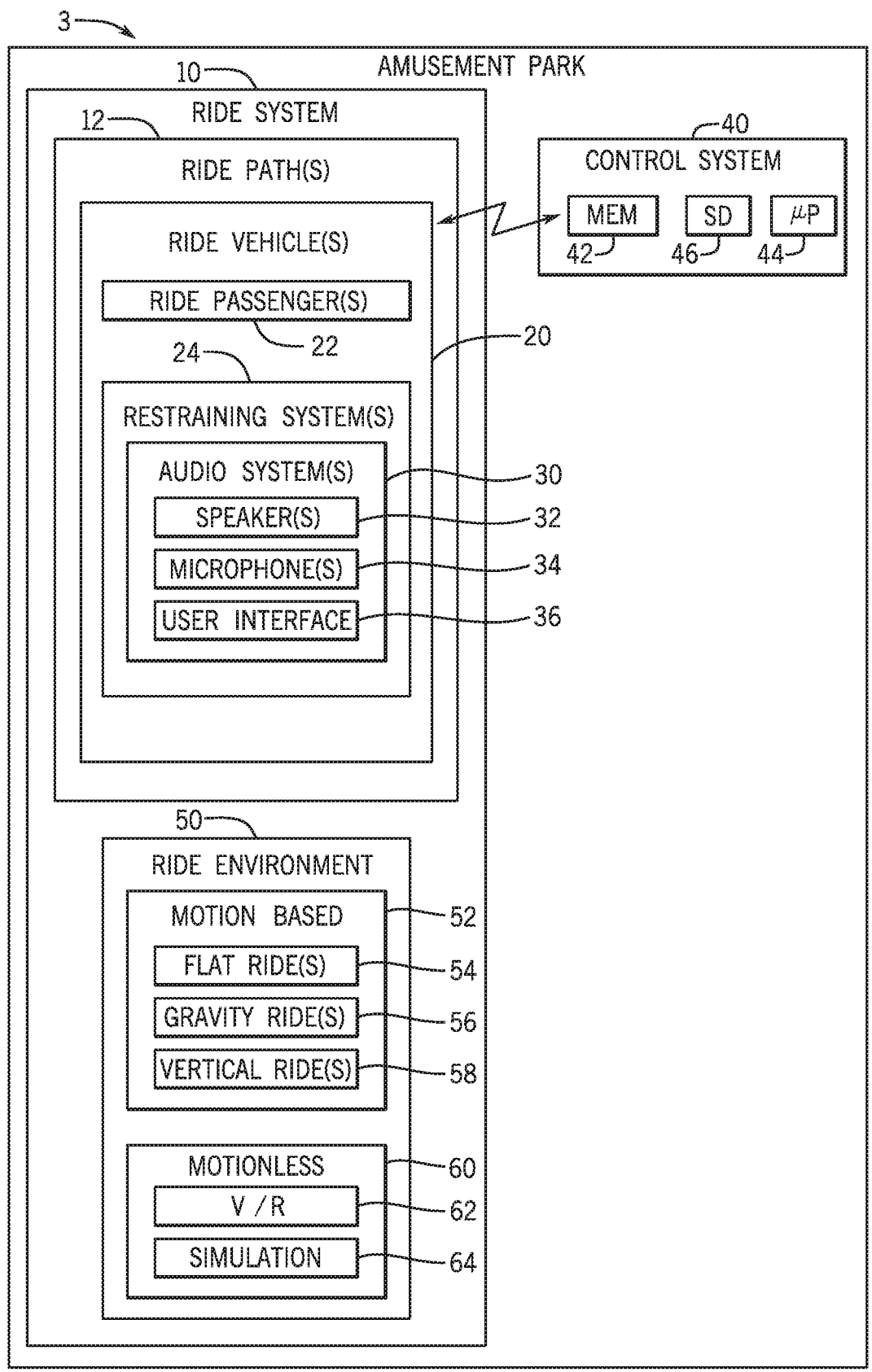
FIG. 1 depicts a block diagram of various components of an amusement park, in accordance an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The systems and techniques described herein include an audio system integrated with a restraint system to enhance the delivery and receipt of audio to and from the passengers of a ride vehicle. Typical amusement parks include a wide variety of amusement park attractions that provide entertainment to a diverse audience of park guests. For example, an amusement park may include amusement park attractions such as ride systems, live performances, interactive characters, music performances, and the like. More specifically, ride systems (e.g., roller coasters or dark rides) include one or more ride vehicles that follow a ride path (e.g., a track) through a series of features. Such features may include tunnels, turns, ups, downs, loops, and the like. Because the ride vehicles often travel at high speeds and traverse along non-linear paths, guests (e.g., passengers) riding inside the ride vehicles may experience strong forces that may move (e.g., jerk) the passenger if the passenger is not secured to the ride vehicle. Accordingly, it is desirable to restrain a passenger while the ride system is in operation. Furthermore, it is now recognized that it may be desirable to add audio features (e.g., speakers and microphones) to the ride vehicle without substantially impacting certain efficiencies. For example, it may be desirable to add audio system components that require limited space (e.g., volume) consumption on the ride vehicle to more efficiently utilize available space. As another example, it may be desirable to limit a weight of such an audio system to avoid inefficiencies (e.g., energy efficiency) associated with maneuvering the vehicle.

Present embodiments may facilitate limiting the size of audio systems by positioning the audio outputs and/or inputs (e.g., speaker and/or microphone) near respective riders, which avoids the need for larger audio systems that allow the riders to experience (e.g., hear) the functionality of the systems from a farther distance. This also facilitates customization for each rider. Further, present embodiments efficiently utilize available space by incorporating audio system components with passenger restraints such that separate space is not substantially consumed or added to the overall vehicle structure. By using the systems and techniques described herein to enhance the entertainment provided to the ride passenger, while maintaining efficient operation of the restraining system, the overall entertainment value of a ride system may be increased, while other efficiencies of operation are at least maintained.

Turning to FIG. 1, depicted is a block diagram of an embodiment of various components of an amusement park 3, in accordance with an embodiment of the present disclosure. As illustrated, the amusement park 3 may include a ride system 10, which includes a ride path 12 that receives a ride vehicle 20, such as by engaging with tires or rollers of the ride vehicle 20, and facilitates movement of the ride vehicle along the ride path 12. In an embodiment, the ride path 12 traces a trajectory for the ride vehicle 20 that includes turns, ups, downs, loops, and the like.

The ride path 12 may receive more than one ride vehicle 20 in accordance with an embodiment. The ride vehicles 20 may be separate from one another or may be coupled to one another via any suitable linkage. For example, the front of a ride vehicle 20 may be coupled to a rear end of another ride vehicle 20 via a pin system. Each ride vehicle 20 in such a configuration may hold one or more ride passengers 22.

As illustrated, the ride vehicle 20 includes a restraining system 24, which may include an overhead lap bar arranged to receive and secure the passenger to the ride vehicle 20 (e.g., against a backrest and seat), as described in more detail below with regards to FIG. 3-6. When the overhead lap bar (e.g., restraining system 24) is not engaged into a locked position (e.g., when the restraining system 24 is in an unlocked position), it may be designed to rest in a configuration such that the overhead lap bar is positioned over the head and shoulders of the passenger. However, when the overhead lap bar is in engaged into the locked position, the overhead lap bar may be pulled down to secure the torso and lap of the passenger against the backrest and seat of the vehicle, respectively. The overhead lap bar may be configured to receive passengers of various sizes by, for example, contracting or extending aspects of the overhead lap bar.

As illustrated, the restraining system 24 may include an audio system 30, which may include a speaker 32, a microphone 34, and supporting cables. The audio system 30 may be positioned inside or otherwise integrated with the restraining system 24. For example, the audio system 30 may include speakers positioned inside a portion of the restraining system 24 closest to the head (e.g., more specifically, the ears) of the ride passenger 22 when the restraining system 24 is actively engaging the passenger 22. The restraining system 24 may include covers (e.g., themed cloth, plastic or metallic grids) integrated with a surface of the restraining system 24 and positioned over the speakers to facilitate the transmission of audio from the audio system 30 to the ears of the passenger 22. As a specific example, wherein the restraining system 24 includes the overhead lap bar, the audio system 30 (e.g., speaker) may be located inside the overhead lap bar under the surface of the overhead lap bar and in close proximity to the ears of the passenger 22. In an embodiment, the audio system 30 may be positioned in an opening in the restraining system 24 and held inside the boundaries of the restraining system 24 by a perforated layer (e.g., cloth, metallic or plastic speaker cover).

The speaker 32 may include an acoustic transducer that operates to convert electrical energy to acoustic energy. More specifically, the acoustic transducer may include an electrostatic balanced armature and a moving coil-loudspeaker. The speaker 32 may be an electrodynamic loudspeaker that includes an electromagnetic coil and diaphragm to generate audio. In an embodiment, the speakers 32 may include a flat panel speaker, such that the flat panel acts as a diaphragm (e.g., made from vinyl, Styrofoam, polypropylene foam, and/or carbon fiber). The flat panel speaker may include an electrostatic flat panel speaker that uses two metal grids with a plastic sheet diaphragm. While only a few examples of the types of speakers 32 that may be used in this embodiment are described, it should be noted that any suitable device capable of dissipating audio to the passenger 22 may be used (e.g., multi-cell flat diaphragm speakers, ribbon driven speakers, plasma arc speakers, piezoelectric speakers).

In an embodiment, the microphone 34 may be a dynamic microphone, which includes a moving-coil and ribbon arrangement. For microphones 34 that are dynamic microphones, the movement of a conductor in the dynamic microphone may induce electric current that is transformed into the reproduction of audio. In an embodiment, the microphone 34 may be a condenser microphone that converts pressure fluctuations into electrical potentials by changes in electrical capacitance. Only a few examples of the types of microphones 34 that may be used in accordance with an embodiment are described, but it should be noted that any suitable device capable of receiving audio from the passenger 22 may be used.

In the illustrated embodiment, the audio system 30 further includes a user interface 36, which may be representative of one or more such interfaces. The user interface 36 may include a button assembly and/or a screen that may receive user inputs. For example, the user interface 36 may include a touch screen configured to navigate through a menu of options displayed on the touch screen based on user inputs (e.g., touching the screen). In an embodiment, the user interface 36 operates to allow the user to control the volume of the audio system 30. Furthermore, the user interface 36 may receive user inputs to control which features of the audio system 30 are powered on and which are powered off. For example, the user interface 36, may allow the passenger 22 to toggle a switch to turn on the speakers 32 (e.g., to output audio) and toggling another switch to keep the microphone 34 muted and/or off (e.g., so that the microphone does not receive any audio indications from the passenger 22). In an embodiment, the user interface 36 may include any number of devices that may facilitate the displaying of information, the receiving of user inputs, and the like.

The illustrated embodiment includes a control system 40 that is communicatively coupled (e.g., via wired or wireless features) to the ride vehicle 20. The control system 40 may be communicatively coupled to one or more ride vehicle(s) 20 of the amusement park 3 via any suitable wired and/or wireless connection (e.g., via transceivers). In an embodiment, the control system 40 may control various aspects of the ride system 10, such as the direction of movement of the ride vehicle 20 along the ride path 12. In an embodiment, the control system 40 may receive data indicative of the user inputs to the user interface 36 to, for example, control the audio system 30 and associated speaker(s) 32, and microphone(s) 34. In the illustrated embodiment, the control system 40 is an electronic controller having electrical circuitry configured to process data associated with the ride vehicle 20, for example, from the transceivers. Furthermore, the control system 40 may be coupled to various components of the amusement park 3 (e.g., park attractions, park controllers).

In the illustrated embodiment, the control system 40 includes a processor 44, such as the illustrated microprocessor, and a memory device 42. The control system 40 may also include one or more storage devices 46 and/or other suitable components.

The processor 44 may be used to execute software, such as software for controlling the ride vehicle(s) 20 and any components associated with the ride vehicle 20 (e.g., audio system 30). Moreover, the processor 44 may include multiple microprocessors, one or more "general-purpose" microprocessors, one or more special-purpose microprocessors, and/or one or more application specific integrated circuits (ASICS), or some combination thereof. For example, the processor 44 may include one or more reduced instruction set (RISC) processors.

The memory device 42 may include a volatile memory, such as random access memory (RAM), and/or a nonvolatile memory, such as ROM. The memory device 42 may store a variety of information and may be used for various purposes. For example, the memory device 42 may store processor-executable instructions (e.g., firmware or software) for the processor 44 to execute, such as instructions for controlling components of the ride vehicle 20.

The storage device(s) 46 (e.g., nonvolatile storage) may include read-only memory (ROM), flash memory, a hard drive, or any other suitable optical, magnetic, or solid-state storage medium, or a combination thereof. The storage device(s) 46 may store data (e.g., image data, audio data), instructions (e.g., software or firmware for controlling the restraining system 24, the audio system 30), and any other suitable information.

In the illustrated embodiment, the ride system 10 also includes a ride environment 50, which may include multiple and differing combinations of environments. For purposes of the present disclosure, the ride environment 50 includes the type of ride (e.g., dark ride, water coaster, roller coaster, VR experience, or any combination thereof) and/or associated characteristics (e.g., theming). For example, the ride environment 50 may include aspects of the ride system 10 that add to the overall theming and/or experience associated with the ride system 10.

In an embodiment, the ride system 10 may have a motion-based environment 52, wherein passengers 22 are transported or moved by the ride system 10. For example, the motion-based environment 52 may include a flat ride 54 (a ride that moves passengers substantially within a plane that is generally aligned with the ground, such as by spinning around a vertical axis and/or translating along a substantially flat path), a gravity ride 56 (a ride wherein gravity is responsible for all or some of the movement), and/or a vertical ride 58 (a ride that displaces passengers 22 in a vertical plane around a fixed point).

Additionally or alternatively, the ride system 10 may include a motionless environment 60, wherein passengers are not substantially transported or displaced by the ride system. For example, the motionless environment 60 may include a virtual reality (V/R) feature 62 (e.g., the passenger may sit in a seat that vibrates or remains stationary while wearing a virtual reality (V/R) headset) and/or a different kind of simulation 64. While the motionless environment 60 may not substantially move the passengers 22, virtual reality and simulation effects can cause disorientation of the passengers 22, which makes the restraining system 24 desirable for controlling movement of the passengers 22. Further, the ride system 10 may include both motion-based and motionless ride environments 52 and 60, which makes the restraining system 24 desirable.

Figure 2:
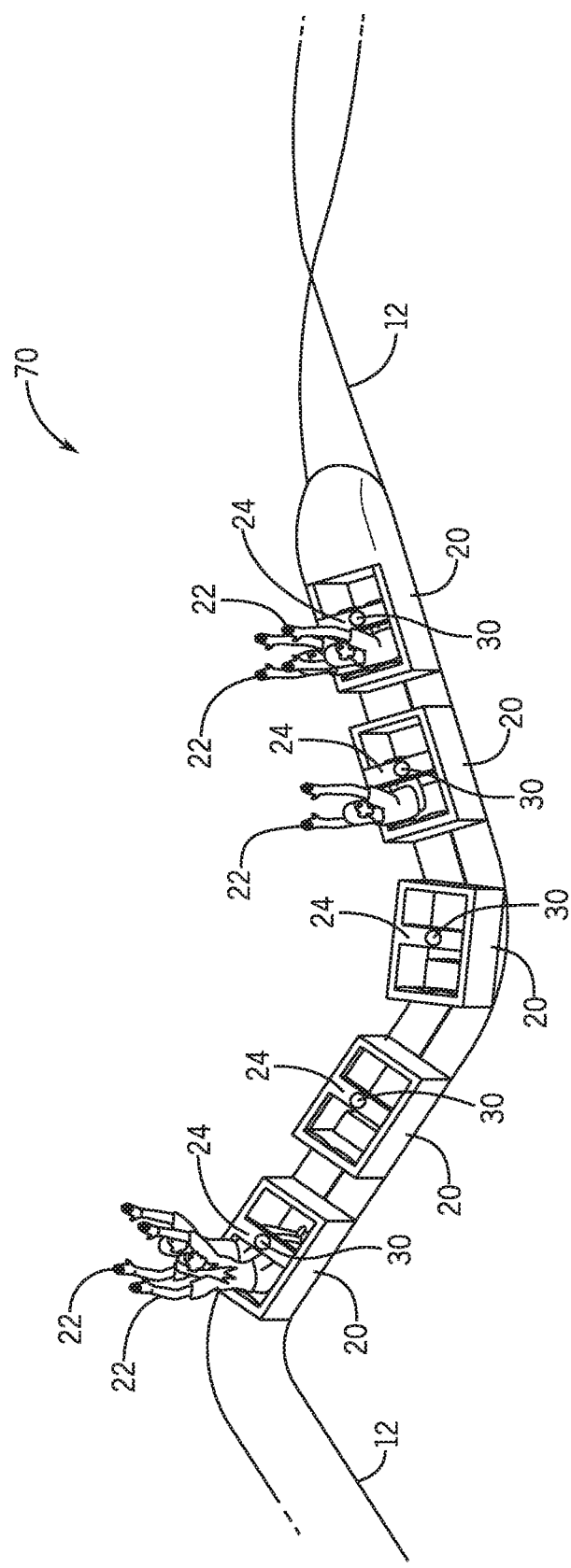
FIG. 2 depicts a perspective view of a ride system, in accordance with an embodiment of the present disclosure.

FIG. 2 is a side perspective view of the ride system 10, in accordance with an embodiment. The ride system 10 includes multiple ride vehicles 20 coupled together via linkages and assembled to hold the passengers 22. The ride vehicles 20 are traveling along the ride path 12.

The ride path 12 may be any feature along which the ride vehicle 20 travels. In an embodiment, the ride path 12 may be a track, a rail, or a road. The ride path 12 may or may not dictate the path traveled by the ride vehicles 20. For example, in an embodiment, the ride path 12 may control the movement (e.g., direction, speed, and/or orientation) of the ride vehicle 20 as it progresses, similar to a train on train tracks. In an embodiment, there may be a system for controlling directions the ride vehicles 20 take along the ride path 12, which may include selecting among various different ride paths 12. For example, the ride path 12 may be an open surface that allows the passengers 22 to control certain aspects of the movement of the ride vehicle 20 via a control system resident on the ride vehicle 20.

As illustrated and as discussed in detail below, each of the ride vehicles 20 includes the restraining system 24 with the integrated audio system 30, in accordance with an embodiment of the present disclosure. In the embodiment illustrated by FIG. 2, the restraining system 24 for each ride vehicle 20 is designed to be positioned above the lap of the passenger 22, such that the restraining system 24 may contact the lap of the passenger 22, thereby securing the passenger 22 to the ride vehicle 20. In other embodiments, the restraining system 24 may include a torso harness or overhead lap bar that pulls over the shoulders of riders to secure their upper bodies relative to corresponding seating. In further embodiments, different restraints may also be utilized.

Figure 3:
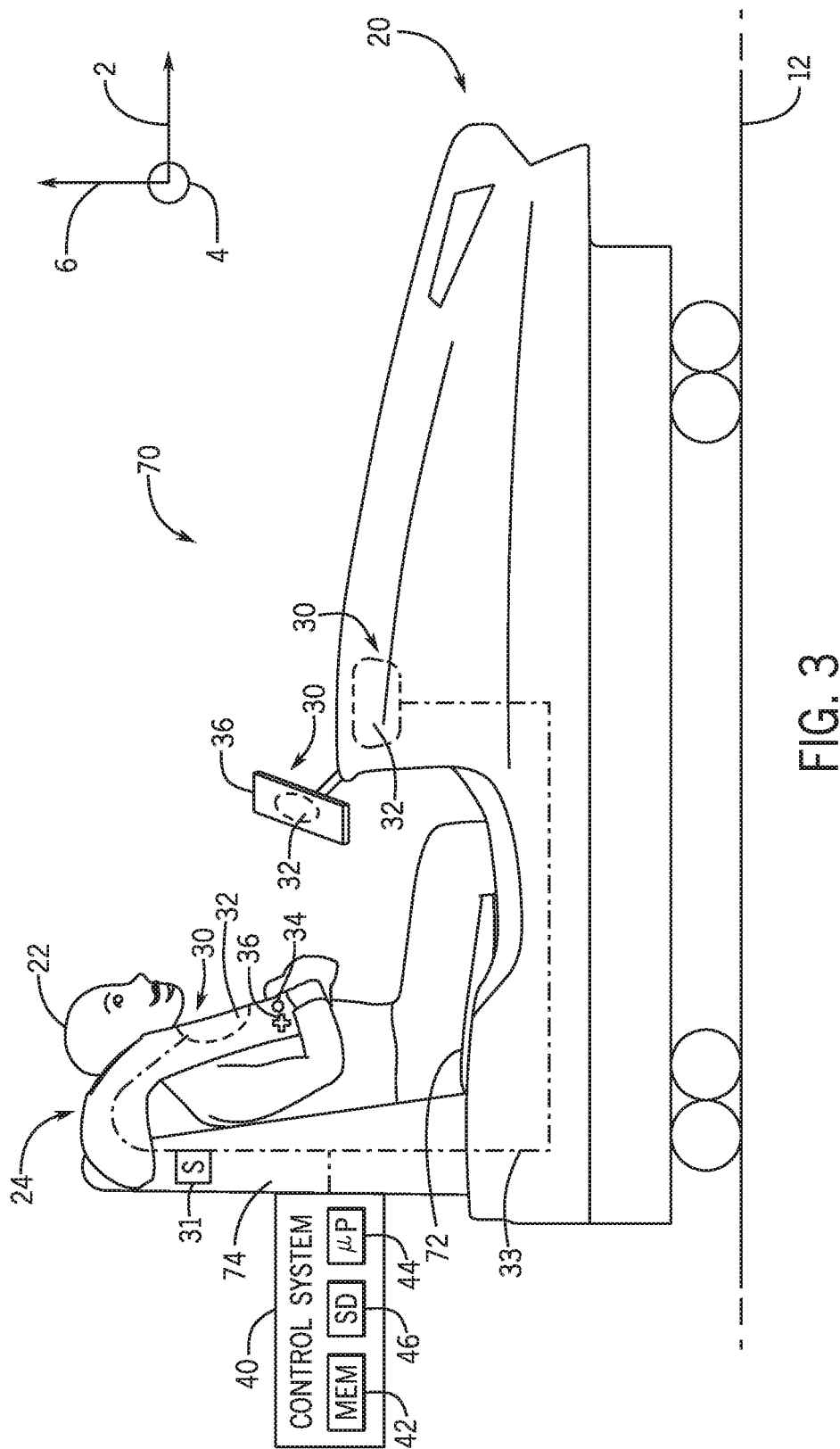
FIG. 3 depicts a side elevational view of a ride vehicle of the ride system of FIG. 1 with a schematic representation of an audio system, in accordance with an embodiment of the present disclosure.

FIG. 3 depicts a side elevational view of one of the ride vehicles 20 of the ride system 10 illustrated in FIG. 2. As schematically illustrated in FIG. 3, the ride vehicle 20 incorporates the audio system 30 into the restraining system 24, in accordance with an embodiment of the present disclosure. For reference, a coordinate system is included in the illustrated embodiment. The coordinate system includes a longitudinal direction 2 (e.g., which is parallel to the forward direction of travel of the ride vehicle 20), a lateral direction 4, and a vertical direction 6. As illustrated, the passenger 22 may be secured via the restraining system 24 while the ride vehicle 20 travels along the path 12. Furthermore, the passenger 22 may sit on the ride vehicle 20 such that the back of the passenger is pressed up against a backrest 74.

The illustrated embodiment includes three audio systems 30 that may independently be controlled by the control system 40. The audio systems 30 may respectively include speaker(s) 32 and microphone(s) 34. The illustrated embodiment includes a first audio system 30 recessed into the restraining system 24, a second audio system 30 on the user interface 36 (e.g., touch screen), and a third audio system 30 recessed into the body of the ride vehicle 20 that may collectively provide a surround sound experience to the passenger 22. The audio system(s) 30 may be actuated (e.g., powered on, toggled on, reconfigured, or caused to change status) to provide the surround sound experience.

In an embodiment, when the restraining system 24 is moved from the unlocked position to the locked position (e.g., such that the passenger 22 is secured to the ride vehicle 20), transitioning of the restraining system 24 between locked and unlocked configurations may be detected by sensors 31 of the audio system(s) 30 or by completion of related circuity 33 of the audio system(s) 30. In an embodiment, when the control system 40, which is physically and/or communicatively coupled to ride vehicle 20, and/or its components (e.g., such as the audio system 30) receives the indication that the restraining system 24 is in the locked position (e.g., via the sensors 31), the control system 40 and/or its components may actuate the user interface 36 and/or the audio system(s) 30. As a specific example, upon engagement of the restraining system 24 in the locked configuration, the locked configuration may be detected and the status of the audio system(s) 30 may change from producing an alert tone to providing sound effects for the ride (e.g., a themed announcement). In some embodiments, this may be done directly by the audio system 30 without involving the control system 40. The change in audio status may provide the indication about the status of the restraining system 24 to the passenger 22 and any staff members managing the ride. Further, upon engaging the restraining system 24, the user interface 36 may receive user inputs to control the audio system 30 and its various components (e.g., speaker 32 and microphone 34). In an embodiment, when the restraining system 24 is not in the locked position, the user interface 36 may not turn on (e.g., remain off), such that it may not receive user inputs. Similarly, the alert tone may continue to be emitted until the locked configuration of the restraining system 24 is entered.

The control system 40 may be communicatively coupled via a wireless connection and/or a wired connection to the audio system(s) 30 of the ride vehicle 20 to control the audio system(s) 30. The restraining system 24 may include the user interface 36 that may include a button configuration to control the audio system 30. For example, the user interface 36 of the restraining system 24 may include a knob for controlling the volume of the speaker(s) 32 of the audio system 30. In an embodiment, the user interface 36 may include a power or activation button corresponding to each of the microphone(s) 34 and speaker(s) 32. The button configuration (e.g., user interface 36) may receive user inputs to control the audio system 30 and any parameters associated with the audio system 30. For example, the user inputs may send signals (e.g., audio activation signals) to the control system 40 to toggle one or more switches to control parameters associated with the audio system 30, such as volume of the speaker(s) 32, status of the microphone 34 (e.g., mute or powered on), and the like.

The control system 40 may automatically produce audio based on a detected location of the ride vehicle 20. For example, the control system 40 may recognize that the ride vehicle 20 is traveling through a tunnel and may cause the audio system 30 to produce audio that matches the general theme of the ride system 10 at that instance in time and/or at that position along the path. This may be done by providing an audio activation signal based on the detected location.

Figure 4:
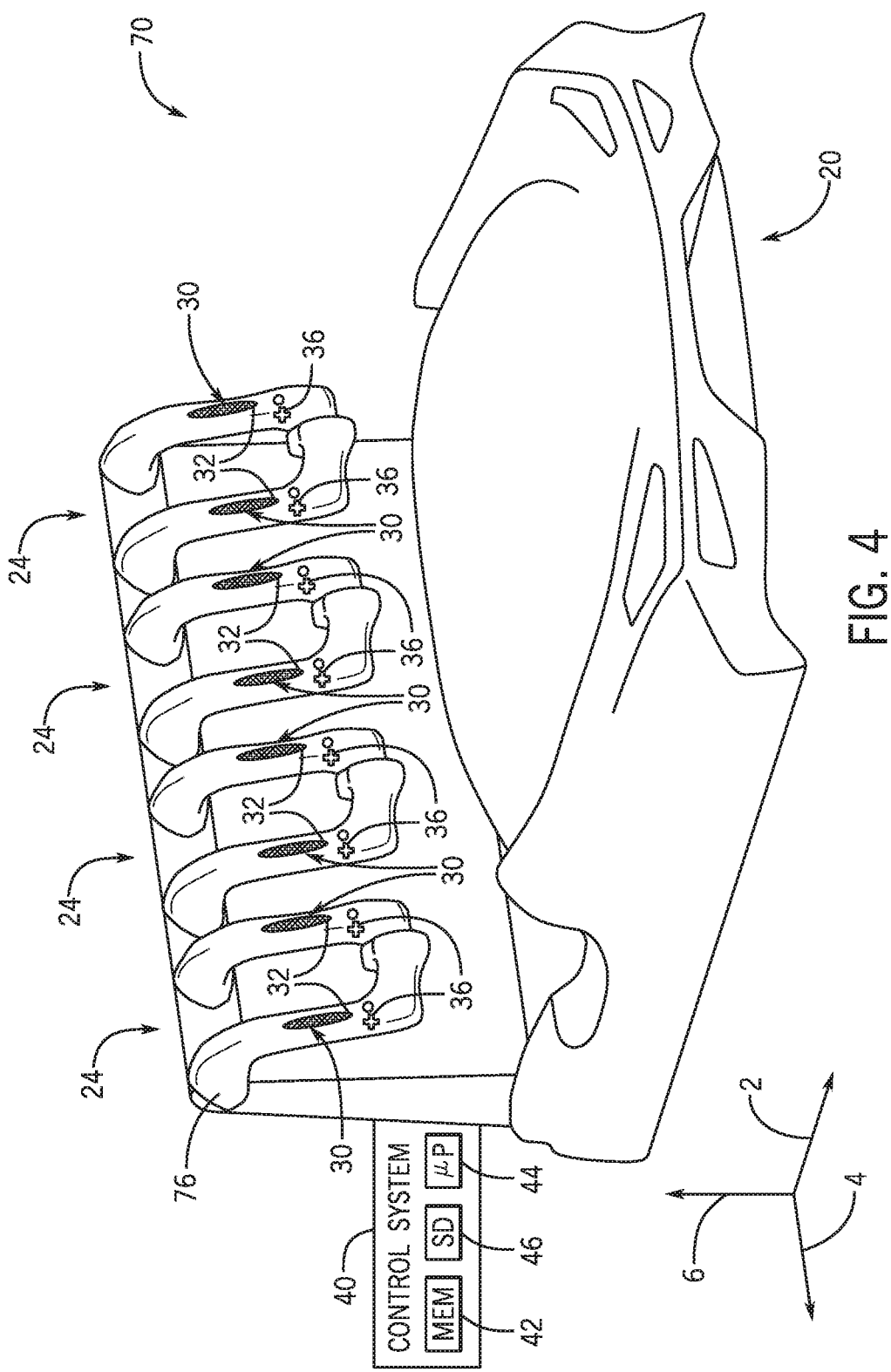
FIG. 4 depicts a perspective view of a ride vehicle of the ride system of FIG. 1 that incorporates more than one audio system into a restraining system, in accordance with aspects of the present disclosure.

FIG. 4 depicts a perspective view of the ride vehicle 20 incorporating more than one audio system 30 into corresponding restraining systems 24, in accordance with an embodiment of the present disclosure. Furthermore, the illustrated embodiment includes four restraining systems 24 aligned in the lateral direction 4, such that each restraining system 24 may secure one ride passenger 22 to the ride vehicle 20. In an embodiment, each of the restraining systems 24 may lock independently of one another. For example, one restraining system 24 may remain upright (e.g., not locked), while other restraining systems 24 are oriented downward in the locked position (e.g., as illustrated in the current embodiment).

In an embodiment, the restraining systems 24 in the locked position may emit audio from the speaker 32 that may serve as the confirmation that the passenger 22 has been secured to the ride vehicle 20 via the restraining system 24. Specifically, the control system 40 (or the audio system 30, directly) may receive a signal indication that the restraining system 24 is in the locked position and, in response, send the signal (e.g., an audio activation signal) to the audio system 30 to cause the corresponding locked restraining system to produce audio that may serve as the confirmation that the passenger 22 has been secured to the ride vehicle 20 via the restraining system 24. For example, after the restraining system 24 has been locked, the associated audio system 30 may produce audio that says "You are now secured to the ride vehicle," "Locked," or any other suitable sound indication that may convey to the passenger 22 and park attendants that the passenger(s) 22 have been secured. As another example, the audio may announce that a particular rider is properly secured (e.g., "rider 3 of car 5 is secured") or simply emit (or stop emitting) music or other sound. In yet another example, when the restraining system 24 has a range of motion and corresponding sensing features, the sound may change (e.g., increase in volume) as a secured or further limiting position is approached from the open position.

The control system 40 may be communicatively coupled to each audio system 30 associated with the ride vehicle 12. In an embodiment of the ride system 10 with more than one ride vehicle 20, the ride system 10 may include one control system 40 that controls each ride vehicle 20 and its associated components (e.g., audio system 30) of the ride system 10. However, in an embodiment, each ride vehicle 20 of the ride system 10 may include a corresponding control system 40 configured to control its corresponding ride vehicle 20 and audio system 30. For embodiments of the ride vehicle 20 designed to accommodate (e.g., seat) more than one passenger 22, each seat may have a corresponding restraining system 24, such that all of the restraining systems 24 are coupled to the control system 40. However, in an embodiment, the ride vehicle 20 may have one control system 40 corresponding to each restraining system 24.

Furthermore, the restraining systems 24 may include any suitable locking mechanism 76. For example, the locking mechanism 76 may be a ratchet system that includes a gear that may rotate about a pawl, such that the gear and pawl are rotatably fixed to a base. The ratchet system may include a round gear with teeth such that the pawl may engage with the teeth and prevent the rotation of the restraining system about (e.g., the lateral direction 4) the locking mechanism 76.

In other embodiments, the locking mechanism 76 may be a hydraulic system that includes an actuated hydraulic pump and hydraulic cylinder that may be activated to lock the restraining system 24 via a bolt assembly after the restraining system moves a certain angular distance. For example, the hydraulic pump may force hydraulic fluid that may drive a piston to engage a bolt to lock the restraining system 24. In an embodiment, when the restraining system 24 is locked (e.g., via the bolt), the user interface 36 corresponding to the audio system 30 associated with the locked restraining system 24 may turn on or otherwise be actuated.

The locking mechanism 76 may include a series of solenoids and pins that may be electrically engaged into a plurality of holes of the locking mechanism 76. As such, the locking mechanism 76 may allow for a plurality of locking positions, thereby allowing the restraining system 24 to secure a wide range of body sizes. In an embodiment, the locking mechanism 76 may include an electromagnetic lock that includes the locking device (e.g., that includes an electromagnet) and an armature plate. As such, the locking mechanism may be "fail secure" such that when the power is lost, the locking mechanism 76 may remain locked or unlocked, depending on the desired outcome.

Figure 5:
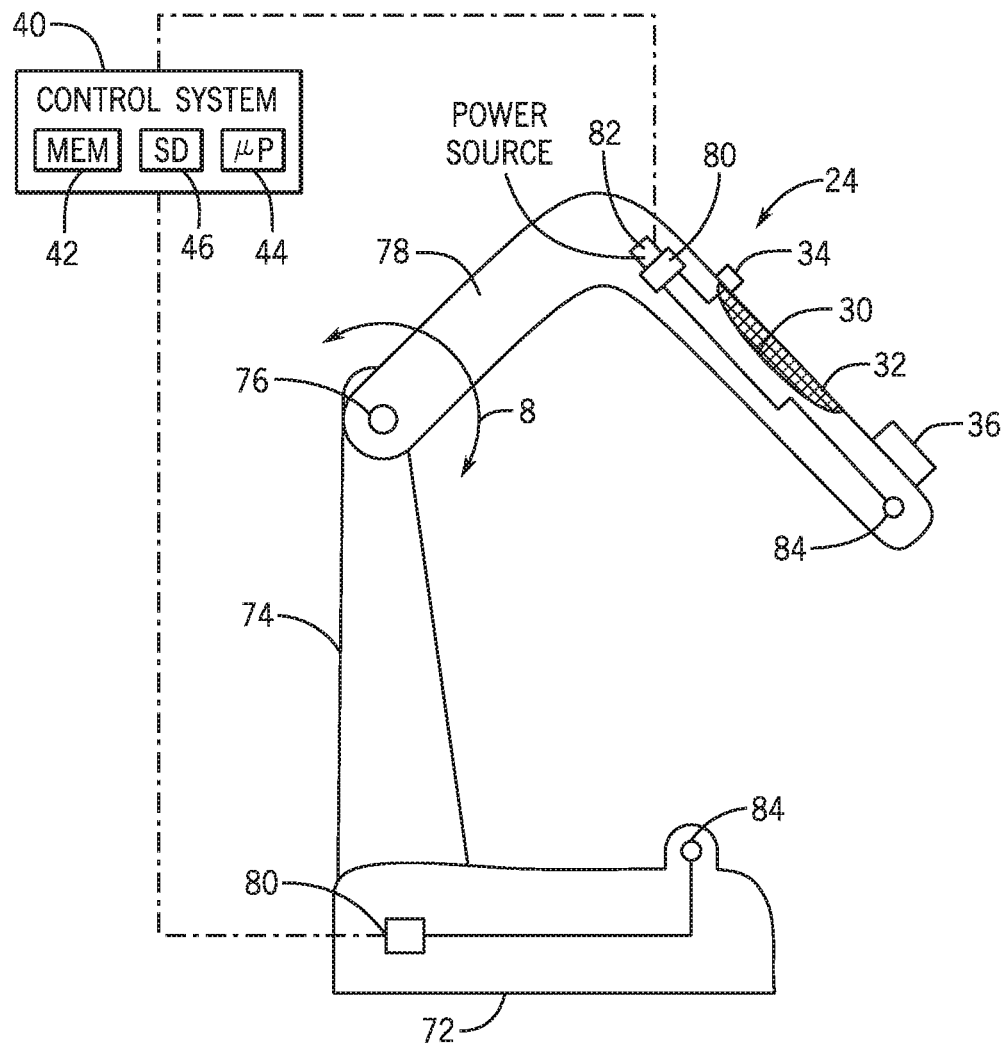
FIG. 5 depicts a schematic side view of a restraining system and aspects of an incorporated audio system, in accordance with an embodiment of the present disclosure.
Figure 5:
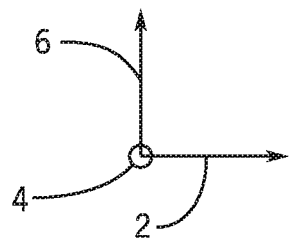

FIG. 5 depicts a schematic side view of the restraining system 24 and aspects of an incorporated audio system 30, in accordance with an embodiment of the present disclosure. More specifically, the illustrated embodiment includes the overhead component 78 of the restraining system 24, and the back rest 74 and the seat 72 corresponding to the bottom component of the restraining system 24. Furthermore, the illustrated embodiment includes the locking mechanism 76 (e.g., ratchet mechanism, hydraulic locking system). The illustrated embodiment also includes the audio system 30 recessed into the portion of the overhead component 78 substantially facing the illustrated longitudinal direction 2 when the overhead component 78 is in the locked position. That is, the overhead component 78 is configured to rotate about the locking mechanism 76 in circumferential direction 8. The illustrated embodiment further includes the speaker 32 and the microphone 34 associated with the audio system 30. In addition, the illustrated embodiment of the overhead component 78 of the restraining system 24 includes the user interface 36, which operates to receive user inputs to control the components associated with the audio system 30.

The illustrated embodiment also includes a transmitter 80 and a power source 82. The audio system 30 may receive power from the power source 82. In an embodiment, the power source 82 may be a battery (e.g., lithium ion and lead-acid). Although the current illustrated embodiment includes a power source 82 located inside the overhead component 78 (e.g., of the restraining system 24), the power source 82 may be incorporated into the audio system 30 or located in any suitable location on the ride vehicle 20. The power source 82 may be wirelessly charged, charged via regenerative braking, charged via a wall outlet (e.g., at the end of the day) or the like.

Furthermore, a proximity sensor set 84 may be powered by the power source 82 and transmit data and/or power (e.g., from the restraining system 24, the audio system, and the control system 40) via the transmitter 80 to the control system 40. As illustrated, the proximity sensor set 84 includes a first sensor 84 on the overhead component 78 and a second sensor 84 on the seat 72. In an embodiment, when the sensors of the proximity sensor set 84 are in close proximity to one another, the locking mechanism 76 may be engaged, such that the configuration of the restraining system 24 may change into the locked position. For example, when the distance between the proximity sensors set 84 (e.g., between the first sensor and second sensor) is below a threshold distance (e.g., away from each other), the signal indicative of locking the restraining system 24 may be sent to the locking mechanism 76 (e.g., via the transmitter 80), such that the locking mechanism 76 locks the restraining system 24. Furthermore, the signal indicative of locking the restraining system 24 may be sent to the control system 40. After receiving this signal, the control system 40 may send a different signal to the associated audio system 30 to produce audio (e.g., "Locking confirmed.") indicating that the passenger 22 is secured to the ride vehicle 20 via the restraining system 24.

Figure 6:
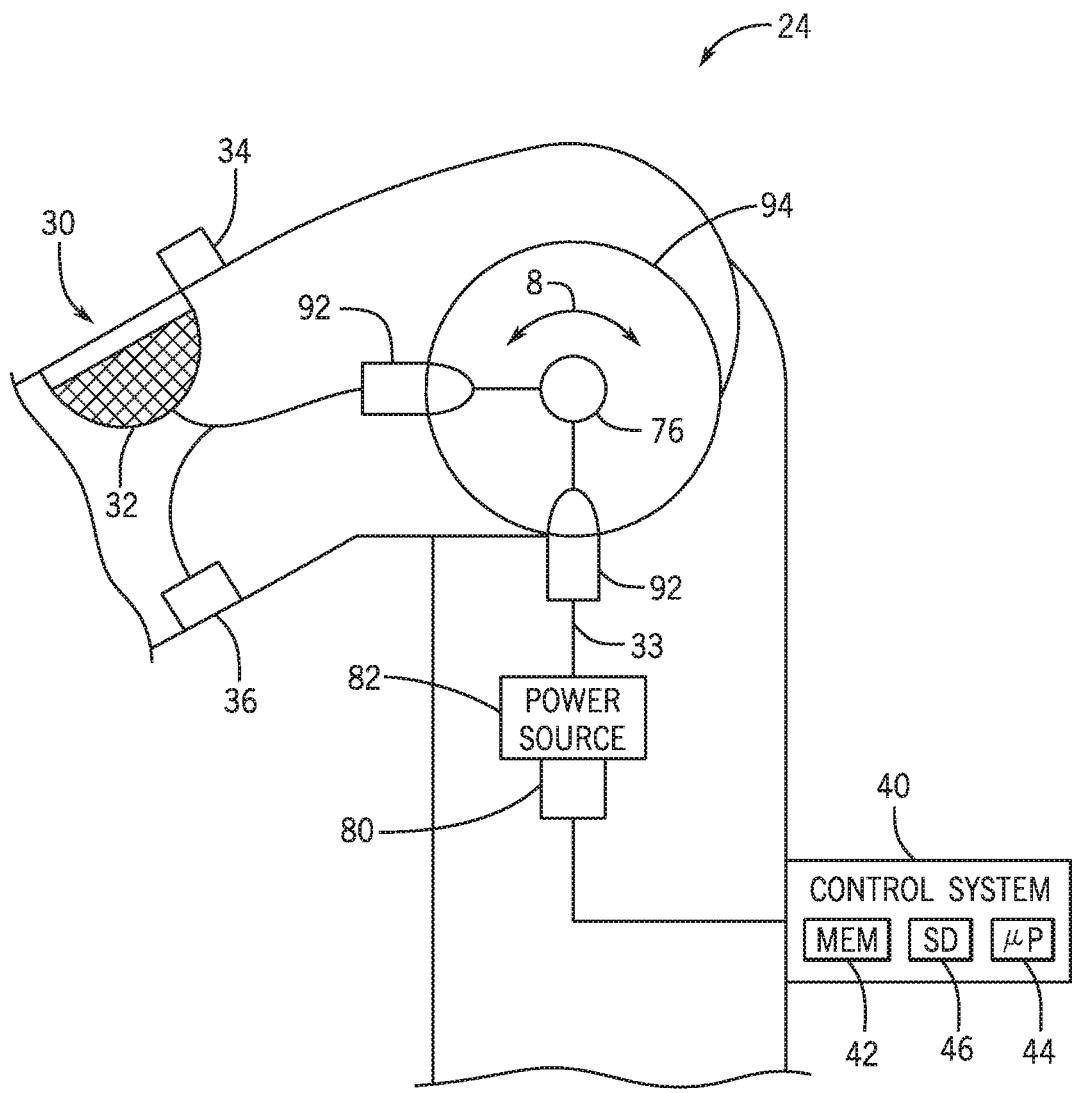
FIG. 6 depicts a schematic representation of circuitry associated with an audio system of a restraining system, in accordance with an embodiment of the present disclosure.

FIG. 6 is a schematic representation of circuitry 33 associated with the audio system 30 of the restraining system 24, in accordance with an embodiment of the present disclosure. The illustrated audio system 30 is communicatively coupled to the control system 40 via circuitry 33, which may be copper wiring, aluminum wiring, and/or any suitable conductive wiring configured to transmit electrical signals. In an embodiment, the audio system 30 may be wirelessly coupled to the control system 40.

In the illustrated embodiment, the restraining system 24 operates to pivotally rotate about a point. For example, the illustrated restraining system 24 may be able to rotate in circumferential direction 8. The illustrated circumferential direction 8 is positioned around an axis oriented along the lateral direction 4 through the locking mechanism 76. The illustrated embodiment includes an electric brush 94 to facilitate the transmission of (e.g., electricity) data to and from the control system 40 and/or power from the power source 82 via the circuitry 33, while allowing the restraining system 24 to pivot about a point and rotate along the circumferential direction 8. The electric brush 94 may facilitate the conduction of current between the circuitry 33 while the restraining system 24 pivotally rotates (e.g., between the locked position and the unlocked position). Furthermore, the electric brush may be (e.g., a high resistance brush) made from graphite and/or copper. In an embodiment, the electric brush 94 may facilitate the wired connection (e.g., via the circuitry 33) between the control system 40 and the audio system 30. Furthermore, the illustrated embodiment includes wire holders 92 that may facilitate the continuous contact between the circuitry 33 and the electric brush 94. In other embodiments, a sufficiently long and flexible wire may be employed to connect the power source 82 and/or control system 40 to the speaker 32 and/or the microphone 34.

The brush 94 may be used in any joints that include circuitry and any joints associated with the ride vehicle 20 that pivotally rotate. Furthermore, in further embodiments, any system may be used to facilitate the transmission of data and/or power via the circuitry 33, while allowing the restraining system to pivot about a point (e.g., along the circumferential direction 8). For example, in an embodiment, a slip ring, a brass communicator, and the like may be used in conjunction with or instead of using the electric brush 94. Other embodiments may include electrically conductive components that coordinate with the pivot mechanism (e.g., hinge) to facilitate communication during open and/or closed configurations of the restraining system 24.

Figure 7:
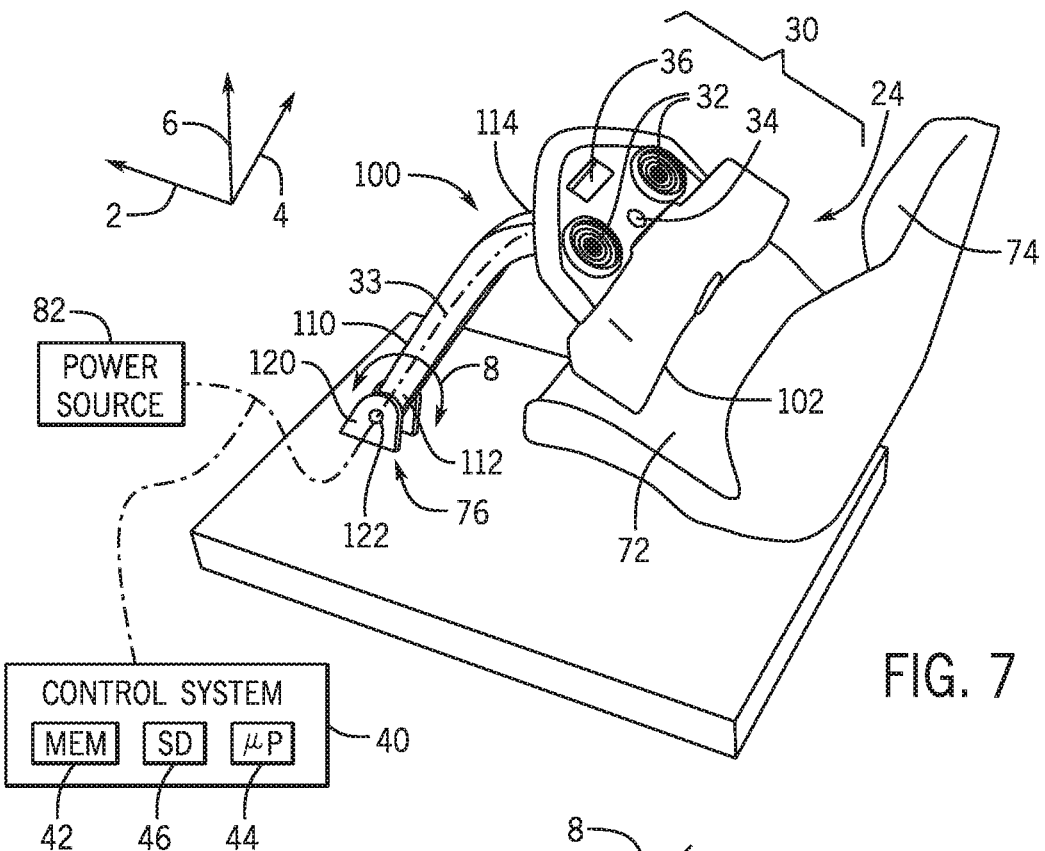
FIG. 7 depicts a perspective view of a one-part restraining system and aspects of an incorporated audio system, in accordance with an embodiment of the present disclosure.

FIG. 7 depicts a perspective view of a one-part restraining system 24 and the incorporated audio system 30, in accordance with an embodiment of the present disclosure. The illustrated embodiment includes the seat 72 and the backrest 74 that may receive the passenger 22. Furthermore, the illustrated embodiment of the restraining system 24 includes one restraint to secure the passenger 22 (e.g., to the seat 72 of) the ride vehicle 20. The illustrated embodiment of the one restraint is a lap bar restraint 100 that includes a padded cummerbund 102 that may contact the lap of the passenger 22 when the lap bar restraint 100 is in the locked position.

Furthermore, the illustrated embodiment of the lap bar restraint 100 includes a shaft 110. The shaft 110 includes a first end 112 and a second end 114. The first end 112 pivotally attaches to the floor (e.g., of the ride vehicle 20) via pivot plates 120 that may receive a pin 122. That is, the illustrated shaft 110 may pivotally rotate about the pin 122 in circumferential direction 8 until the padded cummerbund 102 contacts the lap of the passenger 22. Furthermore, the second end 114 of the shaft 110 may attach to the rear side of the padded cummerbund 102. In an embodiment, the audio system 30 may be communicatively coupled to the control system 40 and/or power source 82 via a wired connection that may include the circuitry 33, wherein the circuitry 33 that passes through the inner surface of the shaft 110 and connects the audio system 30 to the control system 40 and/or power source 82. As mentioned above with regards to FIG. 6, the electric brush (e.g., or any suitable device) may facilitate the rotation of shaft 110 in the circumferential direction 8, while maintaining the audio system 30 coupled, via the circuitry 33, to the control system 40 and/or power source 82.

Furthermore, the illustrated embodiment includes the audio system 30, positioned in the padded cummerbund 102 of the lap bar restraint 100. The audio system 30 in the illustrated embodiment includes two speakers 32, a microphone 34, and a user interface 36. The two speakers 32 are oriented towards the passenger 22, while the passenger 22 is secured (e.g., via the lap bar restraint 100) to the seat 72. Furthermore, the microphone 34 is positioned between the two speakers 32. The user interface 36 is positioned to face the passenger 22, such that, in an embodiment the user interface 36 may be easy view by the passenger 22.

Figure 8:
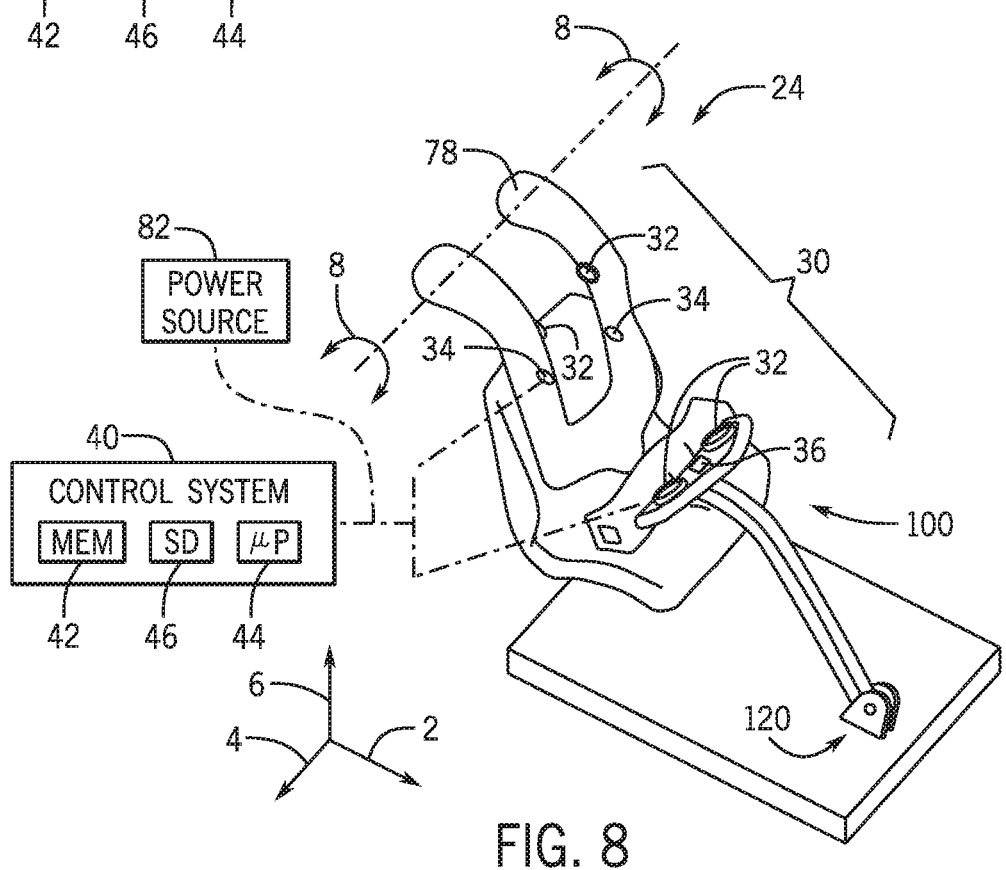
FIG. 8 depicts a perspective view of a two-part restraining system and aspects of an incorporated audio system, in accordance with an embodiment of the present disclosure.

With the following in mind, FIG. 8 depicts a perspective view of a two-part restraining system and aspects of the incorporated audio system 30, in accordance with an embodiment of the present disclosure. The illustrated embodiment of the restraining system 24 includes the lap bar restraint 100 illustrated in FIG. 7 as the first restraint. Furthermore, the illustrated embodiment includes the overhead component 78 as a second restraint, wherein the overhead component 78 may contact the torso of the passenger 22 when the restraining system 24 (e.g., the second restraint) is in the locked position.

Furthermore, the overhead component 78, serving as the second restraint, includes two speakers 32. The two speakers 32 of the illustrated overhead component 78 are oriented substantially perpendicular to the illustrated longitudinal direction 2 on the overhead component (e.g. second restraint), such that the two speakers face each other. Furthermore, the two speakers 32 associated with the overhead component 78, are positioned at a vertical distance along the vertical direction 6, such that the speakers 32 may be aligned along the lateral direction 4 with the ears of the passenger 22, when the passenger 22 is seated in the ride vehicle 20. Furthermore, the two speakers 32 may be separated from each other along the lateral direction 4 by any suitable lateral distance, such that a head of passenger 22 may fit in between the lateral distance between the two speakers 32.

Furthermore, the overhead component 78, serving as the second restraint, includes two microphones 34. The two microphones 34 on the overhead component may be oriented substantially perpendicular to the illustrated longitudinal direction 2 on the overhead component (e.g. second restraint), such that the two microphones face each other. Furthermore, the two microphones 34 associated with the overhead component 78, are positioned at a vertical distance along the vertical direction 6, such that the microphones 34 may be aligned along the lateral direction 4 with the mouth of the passenger 22 (e.g., to facilitate the microphones 34 receiving the voice audio from the passenger 22), when the passenger 22 is seated in the ride vehicle 20. By having multiple speakers 32 in respective restraints of the restraining system 24, the restraining system 24 may be able to deliver the surround sound environment around the passenger 22.

Figure 9:
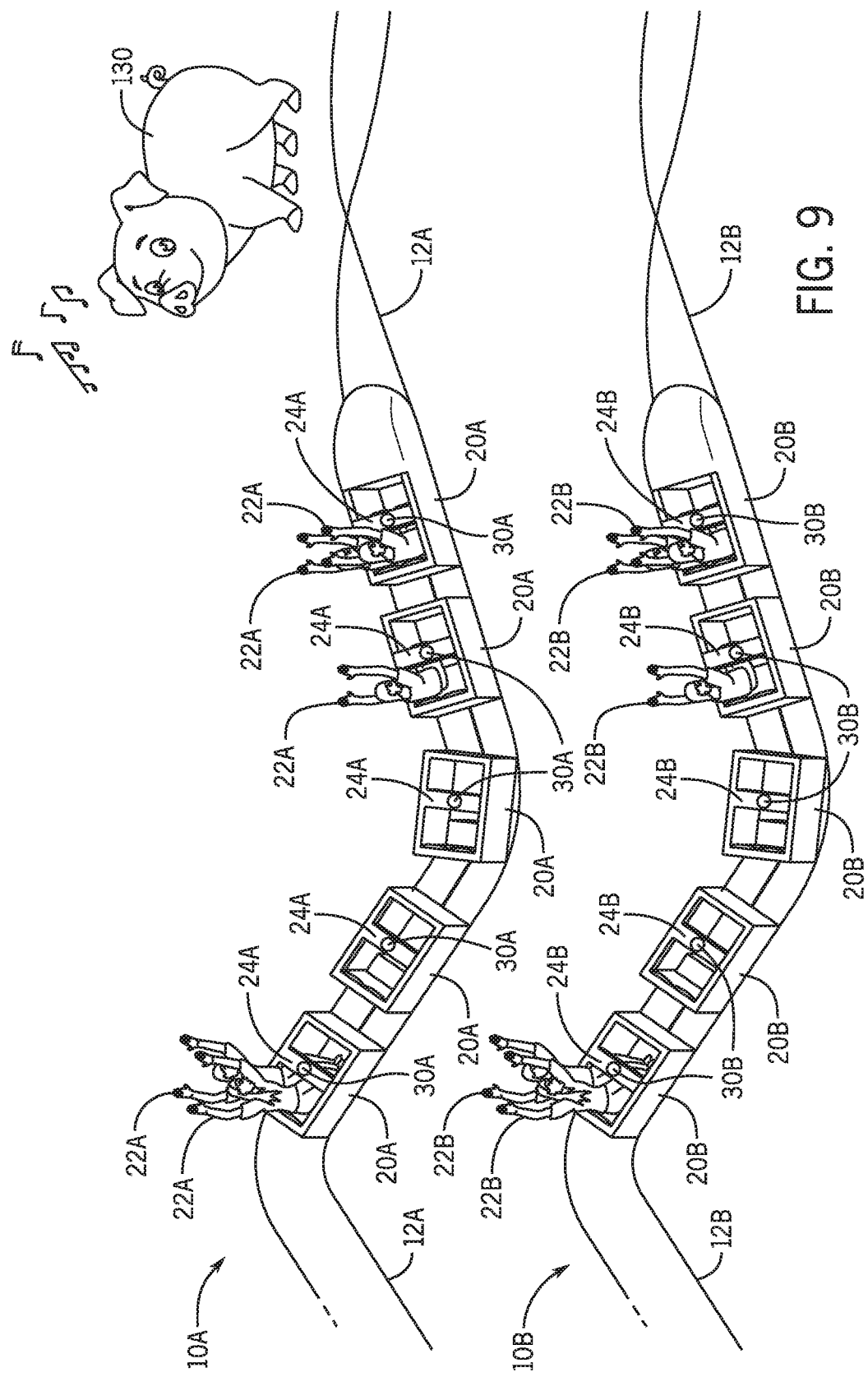
FIG. 9 depicts a side perspective view of two ride systems communicatively coupled to each other and a park attraction via the audio system, in accordance with an embodiment of the present disclosure.

FIG. 9 depicts a side perspective view of two ride systems, a first ride system 10A and a second ride system 10B, communicatively coupled to each other and a ride or park feature (e.g., prop, animatronic, visual feature, robot) 130 via respective audio systems, 30A and 30B, in accordance with aspects of the present disclosure. The first ride system 10A and the second ride system 10B include respective ride vehicles 20A and 20B that may hold and secure respective passengers 22A and 22B via their respective restraining systems 24A and 24B. Furthermore, the first ride system 10A may travel along path 12A, while the second ride system 10B may travel along path 12B.

In an embodiment, the audio systems 30A and 30B may each receive audio signals from the feature 130, illustrated in FIG. 9 as a farm animal animatronic positioned off of the ride vehicle (off-ride), and produce audio via their respective speaker(s) 32. That is, the audio systems 30A, 30B may be communicatively coupled to one or more features 130 (e.g., via a wired or wireless connection), to receive audio signals from the one or more features 130. In an embodiment, the audio systems 30A and 30B may each receive audio signals at different times. For example, when the audio system 30 passes by the feature 130, the audio system may receive a signal from the feature 130 to produce audio via the corresponding speaker 32. The audio may be stamped with a location or time, such that when the ride vehicle 20 passes through a certain location and/or time on the ride path 12, the audio may be produced.

In an embodiment, the ride vehicles 20A may be communicatively coupled with one another via the audio system. For example, a ride passenger 22A may communicate with a different ride passenger 22A in a different ride vehicle 20A, when each of the two ride passengers 22A engage with their respective audio systems 30A. For example, a ride passenger 22A may speak into the microphone associated with his audio system 30, and the verbal message may be sent to a different ride passenger 22A 22B in a different ride vehicle 20A, 20B (or the same ride vehicle). In an embodiment, the audio system 30A may receive audio signals from both the feature 130 (or multiple features 130) and other passengers to produce audio via the speaker(s). In an embodiment, the passenger 22A may selectively choose (e.g., via the user interface of the audio system 30A) whether to block audio from other passengers 22A and/or the feature 130. The passenger 22A may also mute their microphone 34 such that it does not send audio signals as output (e.g., to other passengers).

The first ride system 10A may be located away from the second ride system 10B. The passenger 22A may be in communication with a passenger 22B (e.g., in a different ride system) via their respective audio systems 30A and 30B. For example, the passenger 22A may send verbal messages via the microphone of their audio system 30A to the passenger 22B, such that the passenger 22B receives the verbal messages via the speaker of their audio system 30B. In an embodiment, the passenger 22A may decide which other passengers to be in communication with. For example, the passenger 22A may select the seat number associated with the other passenger(s) (e.g., 22B and/or 22A) that the passenger 22A wants to be in communication with.

Figure 10:
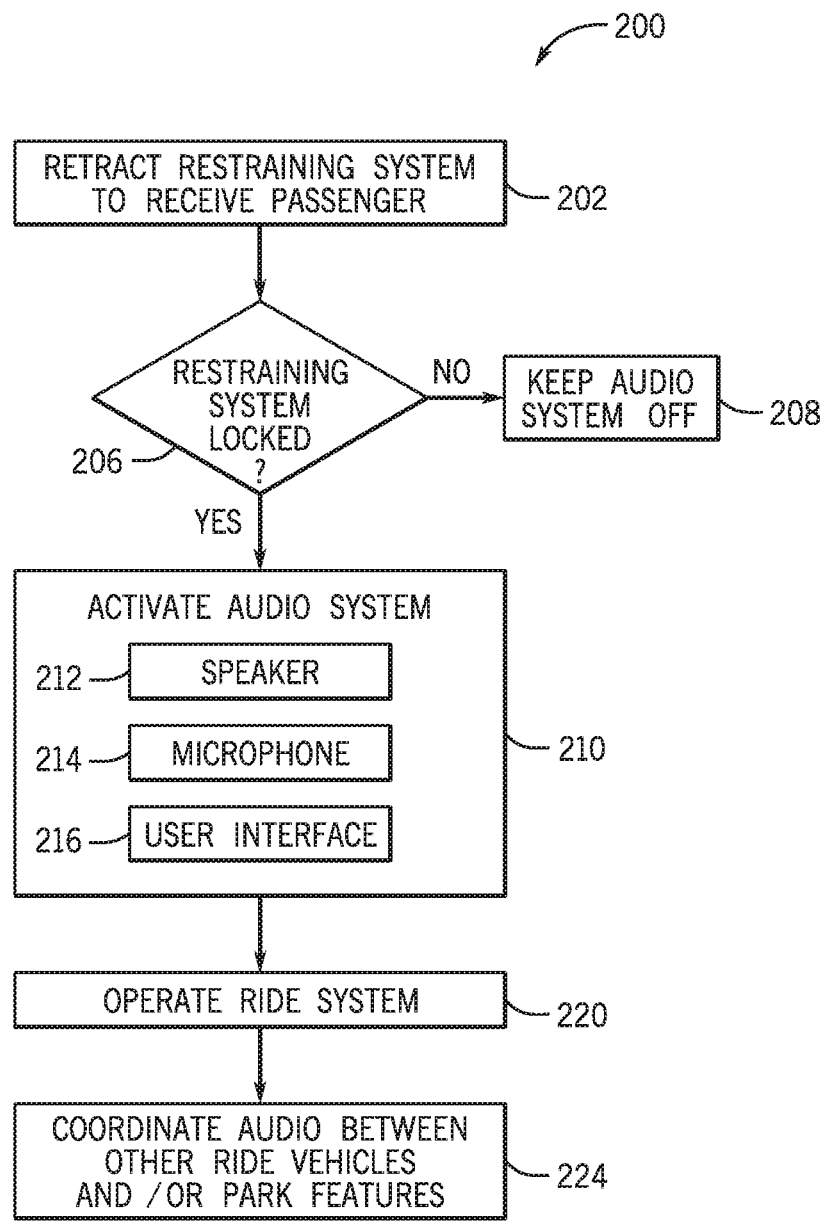
FIG. 10 depicts a flow diagram of a process whereby the audio system is activated to coordinate audio, in accordance with an embodiment of the present disclosure.

FIG. 10 depicts a flow diagram 200 of a process whereby the audio system 30 (FIGS. 1-8) is activated to coordinate audio, in accordance with aspects of the present disclosure. The flow diagram 200 includes a method such that the restraining system 24 (FIGS. 1-8) associated with a ride vehicle 20 (FIGS. 1-4) retracts to receive a ride passenger 22 (FIG. 1-3). A control system 40 (FIGS. 1, 3-8) may identify whether the restraining system 24 is in the locked position. When the restraining system is identified to be in the unlocked position, the audio system 30 remains off. Alternatively, the audio system 30 is activated in response to the control system 40 identifying the restraining system 24 to be in the locked position. After the restraining system 24 has been locked and the audio system has been activated, the control system 40 may cause the ride system 10 to operate, thereby coordinating the audio between the ride vehicle 20 and other ride vehicles and/or the feature 130 (or features) (FIG. 9).

The control system 40 may cause the restraining system 24 of a ride vehicle 20 to retract to receive one or more passengers 22 (process block 202). As such, the restraining system 24 may be in the unlocked position when it is retracted to receive a passenger 22. In an embodiment, the control system 40 may cause the restraining system 24 to receive passenger(s) 22 when the ride system is not in operation and/or the ride vehicle 20 is not moving.

The control system 40 may also determine if the restraining system 24 is in the locked position (decision block 206). That is, in an embodiment, the control system 40 may scan the restraining system 24 at a predetermined periodic time stamp to determine whether the restraining system 24 is in the locked position. In an embodiment, determining whether the restraining system 24 is in the locked position may include determining whether the restraining system contacts the lap of the passenger 22 and is fixed (e.g., via a hydraulic locking system, a ratcheting system). In an embodiment, the locking mechanism of the restraining system may include sensors 31 (FIG. 3) that send signals indicative of the restraining system being in the locked state to the control system 40.

When the restraining system 24 has not been locked, the audio system 30 may remain off (process block 208). For example, when the control system 40 determines that the restraining system 24 is in the unlocked position, the control system 40 may not send the signal indicative of activating (e.g., turning on) the audio system 30. As such, the audio system may remain powered off, such that the speaker 32, the microphone 34, and user interface 36 (FIGS. 1, 3-8) associated with the audio system 30 may also remain powered off. In some embodiments, rather than remain off, the audio system 30 may simply continue to emit a sound (e.g., theme music) until activated, which may allow for sound effects to be emitted instead of mere theme music.

When the control system 40 determines that the restraining system 24 has been locked, the audio system 30 is activated (process block 210). In an embodiment, activating the audio system 30 may include powering on the audio system 30 or activating certain types of sound (e.g., sound effects or music) instead of some other sound. That is, the control system 40 may power the speaker (process block 212). In an embodiment, after the speaker 32 has been activated (e.g., powered on), the speaker may produce audio that serves as the indication that the audio system 30 is on and/or that the restraining system is in the locked position. For example, the speaker 32 may produce audio that says "Restraint locked," "Audio system activated," "Enjoy your ride," and the like. Once the speaker 32 has been powered on, it may produce audio for the passenger 32. The audio may be received from any device or person communicatively coupled with the audio system 30, such as the feature 130 (e.g., a ride animatronic, prop, or park attraction), other passengers 22, and/or a park controller.

In addition, when the control system 40 powers on (or otherwise activates) the audio system 30, the control system 40 may power on (or otherwise activate) the microphone (process block 214) associated with the audio system 40. In an embodiment, when the microphone 34 has been powered on or activated, it may receive verbal audio from the passenger 22. In an embodiment, the verbal audio may be sent to other passengers (e.g., in the ride system 10), so that passengers may be in communication with one another while the ride system 10 is in operation.

Furthermore, the control system 40 may power on (or otherwise activate) the user interface(s) (process block 216) associated with the audio system 30. After the user interface 36 has been powered on or activated, the control system 40 may receive user inputs to modify the operation of the audio system 30. For example, based on the user inputs, the control system 40 may modify the audio system 30 to only produce audio from the feature 130 (or features 130), while blocking out audio received from the microphones of other ride passengers. In an embodiment, the user interface 36 allows passengers 22 to personalize their audio system 30 such that it may send audio to and/or receive audio from selected devices.

After the audio system 30 and its various components have been activated, the control system 40 may operate the ride system 10 (process block 220). As discussed above, the ride system 10 may have the motion-based environment 52 (FIG. 1), wherein passengers 22 are transported or moved by the ride system 10. For example, the motion-based environment 52 may include the flat ride 54, the gravity ride 56, and/or the vertical ride 58 (FIG. 1). As such, operating the ride system 10 may include controlling the ride vehicle 20, such that the ride vehicle follows the target trajectory. Additionally or alternatively, the ride system 10 may include the motionless environment 60, wherein passengers are not substantially transported or displaced by the ride system. For example, the motionless environment 60 may include the virtual reality (V/R) feature 62 and/or a different kind of simulation 64. As such, operating the ride system 10 may include controlling the display of the virtual reality features and/or simulations.

Furthermore, the control system 40 coordinates the audio between ride vehicles and/or ride or park features (process block 224). In an embodiment, the control system 40 may coordinate the audio between ride vehicles 20 based on the user selection to the user interface 36, while the ride system 10 is in operation. For example, the first passenger may select on the user interface 36 (e.g., via toggling the switch) to only receive audio from the ride or park features 130 (e.g., an animatronic pig on the ride path the ride vehicle 20 may travel on). As such, the control system 40 may accordingly coordinate the audio between the audio system 30 associated with the first passenger, thereby muting the associated microphone 34, blocking audio received from other passengers, and causing the associated speakers 32 to only produce audio from the park feature 130. In an embodiment, the control system 40 may couple the audio systems 30 corresponding to the restraining systems 24 and/or the ride vehicles 20 to the feature 130, thereby coordinating audio between the feature 130 and the audio systems 30.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
 a restraining system for a ride vehicle of an amusement park, wherein the restraining system is configured to generate an audio activation signal when in a locked configuration; and
  an audio system comprising a speaker and a microphone, wherein the audio system is positioned inside of the restraining system, and configured to produce audio via the speaker and change the produced audio from a first sound type to a second sound type in response to the audio activation signal.

2. The system of claim 1, wherein the restraining system is configured to contact a ride passenger on the ride vehicle to secure the ride passenger to the ride vehicle when the restraining system is in a locked position.

3. The system of claim 2, wherein the restraining system is a two part restraining system, wherein the two part restraining system comprises an overhead-pull-down restraint and a lap bar restraint, the overhead-pull-down restraint comprising the speaker and the microphone, and the lap bar restraint comprising an additional speaker.

4. The system of claim 3, wherein the speaker and the additional speaker are configured to collectively produce the audio, wherein the audio is received from a separate audio system of a separate ride vehicle.

5. The system of claim 1, comprising:
 an additional ride vehicle that is separate from the ride vehicle; and
 an additional audio system of the additional ride vehicle, the additional audio system comprising an additional speaker, and an additional microphone;
 wherein the microphone and the additional microphone are configured to receive audio data and transmit the audio data to the additional speaker and the speaker, respectively, to facilitate communication between users of the audio system and the additional audio system.

6. The system of claim 1, wherein the audio system comprises a user interface configured to receive a user input, wherein the speaker or microphone is configured to be activated or deactivated in response to the received user input.

7. The system of claim 1, comprising a control system separate from the ride vehicle and configured to coordinate sound from off-ride features with the speaker.

8. The system of claim 1, wherein the audio system is communicatively coupled to a park or ride feature and configured to produce the audio in response to communications with the park or ride feature.

9. The system of claim 1, wherein the audio system is connected to a power source via a wired connection, wherein the wired connection contacts a brush at a pivot joint of the restraining system.

10. A ride system, comprising:
 a first audio system positioned inside a first restraining system associated with a first ride vehicle;
 a first speaker of the first audio system;
 a first microphone of the first audio system;
 a second audio system positioned inside a second restraining system associated with a second ride vehicle, wherein the first audio system and the second audio system are communicatively coupled to one another to facilitate transmission of audio data there between;
 a second speaker of the second audio system; and
 a second microphone of the second audio system,
 wherein the first audio system and the second audio system comprise respective circuitry configured to communicatively couple to respective control systems, wherein the respective control systems each comprises a processor configured to execute instructions stored in a memory of the respective control systems, and
 wherein the first restraining system and the second restraining system are each configured to pivotally rotate about respective joints, wherein the respective joints each include an electric brush configured to continuously contact the respective circuitry while the respective restraining system pivotally rotates.

11. The ride system of claim 10, wherein the respective control systems are configured to cause the respective first and second microphones to receive audio input and the respective first and second speakers to produce audio output.

12. The ride system of claim 10, comprising a first user interface of the first audio system, wherein the first user interface is configured to control the first speaker and the first microphone.

13. A method of operating a restraining system for a ride vehicle of an amusement park and an audio system including a speaker and a microphone, wherein the audio system is positioned inside of the restraining system and configured to produce audio via the speaker in response to an audio activation signal, wherein the ride vehicle is communicatively coupled to a second ride vehicle and an off-ride feature, the method comprising:
 retracting the restraining system, wherein retracting the restraining system comprises moving the restraining system into an unlocked position, and wherein the ride vehicle is configured to receive a ride passenger when the restraining system is in the unlocked position;
 determining, via a processor, whether the restraining system is in a locked position; and
 controlling the audio system associated with the ride vehicle based on the restraining system being in the locked position or the unlocked position, wherein controlling the audio system comprises activating the audio system by producing the audio received from the second ride vehicle or the off-ride feature via the speaker.

14. The method of claim 13, wherein the audio system comprises a user interface and multiple speakers.

15. A system, comprising:
 a restraining system for a ride vehicle of an amusement park, wherein the restraining system is configured to contact a ride passenger on the ride vehicle to secure the ride passenger to the ride vehicle when the restraining system is in a locked position, wherein the restraining system comprises:
  an overhead-pull-down restraint comprising a speaker and a microphone; and
  a lap bar restraint comprising an additional speaker; and an audio system positioned inside of the restraining system and configured to produce audio via the speaker and the additional speaker in response to an audio activation signal from a separate audio system of a separate ride vehicle.

16. A restraining system for a ride vehicle assembly of a theme park, the restraining system comprising:
 a first restraint, comprising a first audio system comprising a first speaker and a first microphone, wherein the first audio system is fixed and recessed within the first restraint; and
 a second restraint, comprising a second audio system comprising a second speaker and a second microphone, wherein the second audio system is fixed and recessed within the second restraint,
 wherein the first audio system and the second audio system are configured to establish communication with one another via a communicative coupling to allow communication between the first restraint and the second restraint, via the first audio system and the second audio system, respectively, in response to the first and second restraint being in a locked configuration.

17. The restraining system of claim 16, wherein the first restraint is configured to secure a first passenger to a first ride vehicle, and the second restraint is configured to secure a second passenger to a second ride vehicle.

18. The restraining system of claim 16, wherein the first audio system and the second audio system are communicatively coupled to an off-ride feature.

19. The restraining system of claim 18, wherein the first speaker and the second speaker are configured to produce audio in response to receiving an audio activation signal from the off-ride feature.

\* \* \* \* \*